Nov. 23, 1926.
R. W. SCHULTE
GASOLINE GAUGE
Filed Dec. 9, 1925 2 Sheets-Sheet 1
1,607,645
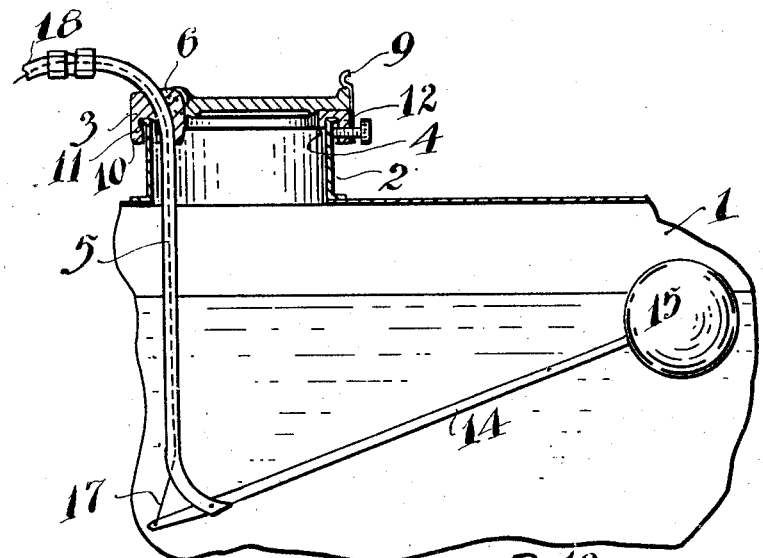
Fig.1
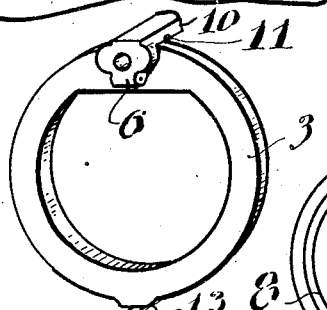
Fig.3
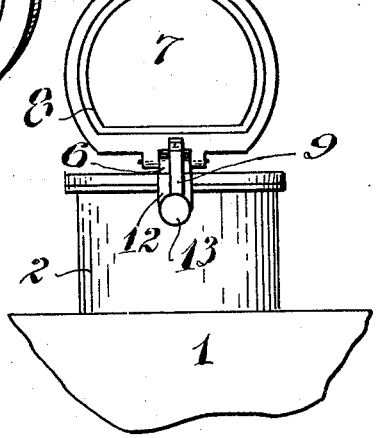
Fig.2
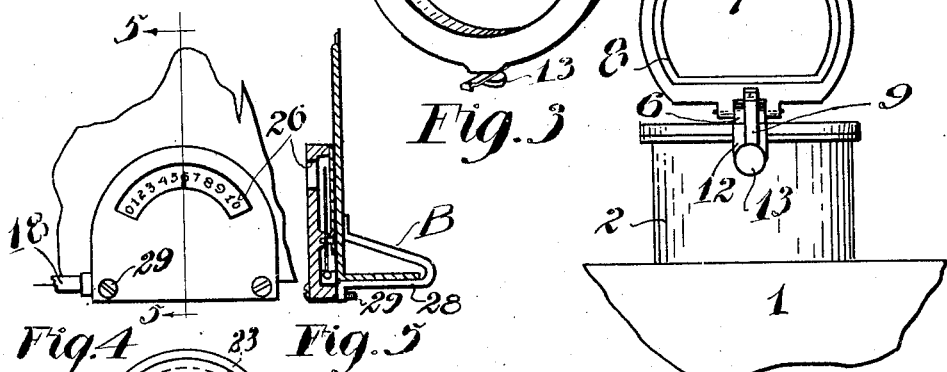
Fig.4  Fig.5  Fig.6
Inventor
Robert W. Schulte
By 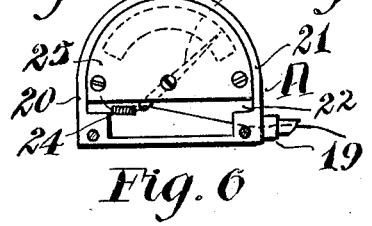
Attorney Nov. 23, 1926.

R. W. SCHULTE

GASOLINE GAUGE

Filed Dec. 9, 1925

Inventor
Robert W. Schulte
By J. H. S. Johnson
Attorney

Patented Nov. 23, 1926.

1,607,645

UNITED STATES PATENT OFFICE.

ROBERT W. SCHULTE, OF ST. PAUL, MINNESOTA, ASSIGNOR OF ONE-HALF TO THOMAS D. LANE, OF ST. PAUL, MINNESOTA.

GASOLINE GAUGE.

Application filed December 9, 1925. Serial No. 74,301.

The present invention relates to a gasoline gauge for automobiles and more particularly for automobiles having a gasoline tank mounted under the cowl thereof.

An object of the present invention is to register the amount of fuel in a tank by means mounted on an instrument board adjacent said tank.

Another object is to make a float assembly and a gauge assembly interconnected by means of a flexible control mechanism to form a single unit, the float mechanism being positioned on a fuel tank and the indicating mechanism being connected to an instrument board.

In order to attain these objects, there is provided, in accordance with one feature of the invention, a float assembly having a control wire operatively connected to a float arm, the float arm being pivotally connected to a tubular support which extends through a ring clamped on the filling pipe of a fuel tank, the tubular support having connected thereto a flexible tube which extends to a gauge assembly clamped to the instrument board of the motor car upon which the device is to be used.

The gauge comprises a housing having an indicating needle pivotally mounted therein, the needle being connected to the float arm by means of a flexible wire passing through the flexible tubing, and the tubular float arm support. A light spring may be connected to the needle to resiliently urge it in an opposite direction from the pull of the flexible control wire to retain the flexible control wire in tension and prevent loss of motion by a loosening of said wire.

These and other features of the invention, not specifically mentioned, will be more fully brought out in the following description and the accompanying drawings, wherein:

Figure 1, is a view in vertical section through a partly filled fuel tank, a float assembly being shown operatively mounted therein.

Figure 2, is a view in front elevation of a filler opening in the fuel tank with a hinged cover made in accordance with the present invention mounted thereon.

Figure 3, is a view in isometric perspective of a mounting ring.

Figure 4, is a view in front elevation of a gauge assembly, showing the indicating needle midway thereof.

Figure 5, is a sectional view on the line 5—5 of Figure 4;

Figure 7:
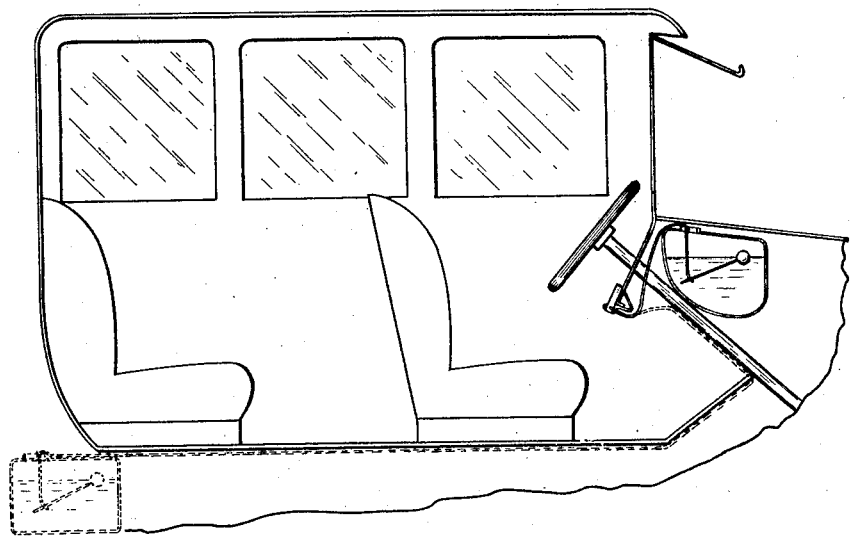

Figure 6, is a view in rear elevation of the gauge, showing the indicating needle in a normal or "empty" position; and, Figure 7, is a view in longitudinal section through a motor car showing the gauge in position thereon in solid lines as it is employed in a car wherein the gasoline tank is located under the cowling and in dotted lines as it would appear when used with an automobile having the gasoline tank in the rear thereof.

Referring to the drawings in detail, a tank 1 is provided with a filling pipe 2 in a well known manner. An annular member 3 is mounted on the filling pipe, having a small flange 4 extending downwardly into the interior of the filling pipe to form a substantially liquid tight seal therewith. One side of the annular member 3 extends into the opening of the filler pipe and is made of greater thickness than the remainder of the annular member to supportingly receive a tubular float arm support member 5 in a hole drilled therein. Pivotally connected to a stud 6 extending outwardly from the thickened portion of the annular member is a cover 7 having a small flange 8 extending downwardly into the central aperture of the annular member 3. The forward end of the cover is normally retained in position by means of a spring 9 connected to the front of the annular member 3. The annular member 3 is provided with a lug 10 extending downwardly from the rear thereof, the upper portion of which is undercut as at 11 to receive a flange at the top of the filling pipe 2 and hold the annular member in position thereon. A second lug 12 projects downwardly from the forward edge of the annular member 3 and to the front of this lug is connected the spring 9. A set screw 13 is threadedly inserted in the lug 12 and when the annular member 3 is in position the set screw 13 is screwed inwardly to grip the filling pipe and retain the annular member 3 firmly in position thereon.

Pivotally connected to the lower end of the tubular float arm suport 5 is a float arm 14, having connected to its outer end a float 15 which may be of cork. Spaced from the pivot upon which the float arm is fulcrumed, by a distance which may be determined in a manner to be brought out later in the specification, is a steel wire 17, such as piano wire, which is preferably of small diameter. The wire is connected to the end of the float arm and is passed into the interior of the tubular support arm and thence upwardly therethrough. A flexible tubular member 18 is connected to the upper end of the float support arm as it emerges from the annular member 3, the opposite end of the flexible tubular member being connected to a gauge A as by means of a threaded sleeve 19. The gauge comprises a casing 20 having a surrounding rim 21 and a depressed central portion 22 on the rear thereof. Pivotally mounted interiorly of the depressed central portion of the gauge is an indicator needle 23, the lower end of the needle having engagement with the control wire 17 as it emerges interiorly of the casing.

A spring 24 may also be connected to the needle and to a plate 25 forming a closure across the rear of the casing to resiliently urge the needle to a normal position. An arcuate opening 26 is provided in the casing to describe a curve substantially coincident with the path of travel of the point of the indicator needle. Numerals indicating the number of gallons registered by the gauge may be printed upon the front face of the rear closure plate 25 to be visible in the arcuate opening 26.

The gauge may be connected to the instrument board of a motor car by means of a clamp B. The clamp is provided with a lower arm 28 having a downwardly turned end penetrated by a screw 29 which threadedly engages an opening in the downturned end of the clamp. The clamp is turned inward beyond the edge of the instrument board and extends inwardly a sufficient distance to firmly engage the rear face of the instrument board to exert a pressure between the instrument board and the gauge to clamp the gauge firmly in position thereon.

To adjust the gauge for use on a particular type of motor car, the position of the float arm at "full" and "empty" position is determined by observation and the travel of the wire is also determined in the same manner. The length of the needle from the pivot to the point at which the wire is connected is computed or observed by actual measurement during a complete actuation of the float arm as from "empty" to "full" positions, the arm being made of a length to move the indicator needle entirely across the scale formed by the numerals on the plate 25.

A particular advantage of the present invention lies in the fact that the complete unit, including the gauge, the flexible tubing, and the float assembly, may be assembled when made, and may be applied to a motor car as a unit by connecting the float assembly to the tank of a motor car by the set screw 13 and connecting the gauge to the instrument board by means of the clamp B.

What I claim is:

In combination with the fuel tank and instrument board of an automobile, an annular member removably connected to the filling pipe of the fuel tank, a cover hingedly connected thereto, a tubular support arm penetrating a side of the annular member extending downwardly into the tank, a lever fulcrumed on said support arm, a float connected to an end of said lever to float on the surface of liquid fuel contained in the tank, indicating mechanism clampingly mounted on the instrument board of the automobile and having a movable indicating element therein, a tubular housing in open communication with the tubular support member in the fuel tank and with the interior of the indicating mechanism, and flexible control means connected to the indicating element and extending through the tubular housing and through the tubular support arm, and having operative connection with the float lever in spaced relation from the fulcrum thereof.

In testimony whereof I affix my signature.

ROBERT W. SCHULTE.